Dec. 7, 1965  R. E. COWLING  3,221,482
MOWING APPARATUS WITH A MOWER HEAD UNIVERSALLY
SUPPORTED BY AN EXTENSIBLE BOOM
Filed Oct. 21, 1963  4 Sheets-Sheet 1

ROBERT E. COWLING
INVENTOR.

BY
Browning, Simms, Hyer & Eickenroht

ATTORNEYS

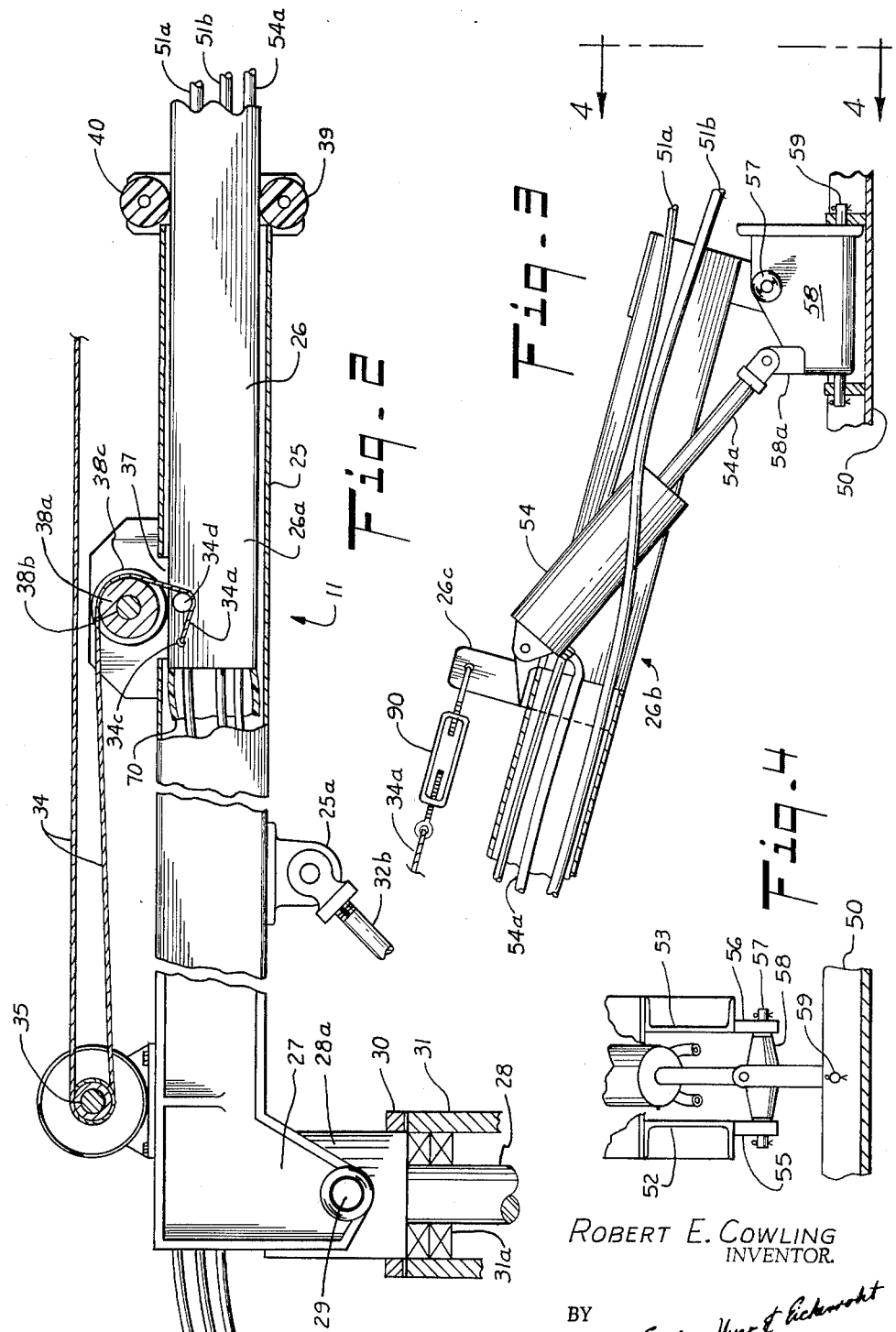

Dec. 7, 1965  R. E. COWLING  3,221,482
MOWING APPARATUS WITH A MOWER HEAD UNIVERSALLY
SUPPORTED BY AN EXTENSIBLE BOOM
Filed Oct. 21, 1963  4 Sheets-Sheet 3
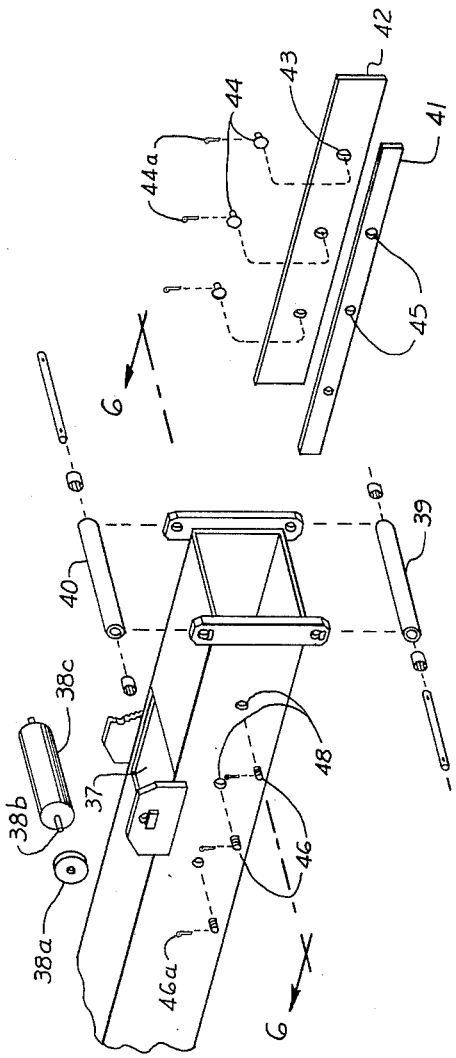
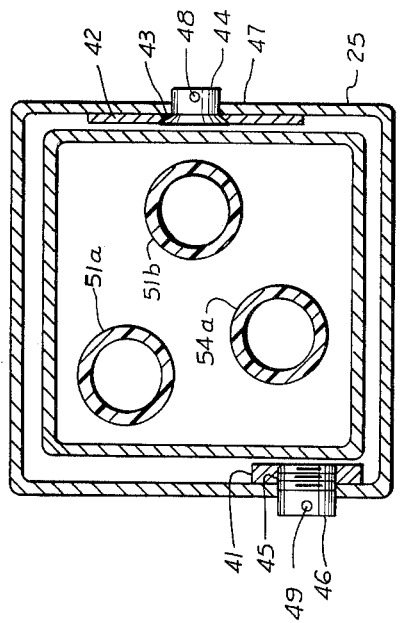
ROBERT E. COWLING
INVENTOR.
BY
Browning, Simms, Hyer & Eckerroht
ATTORNEYS

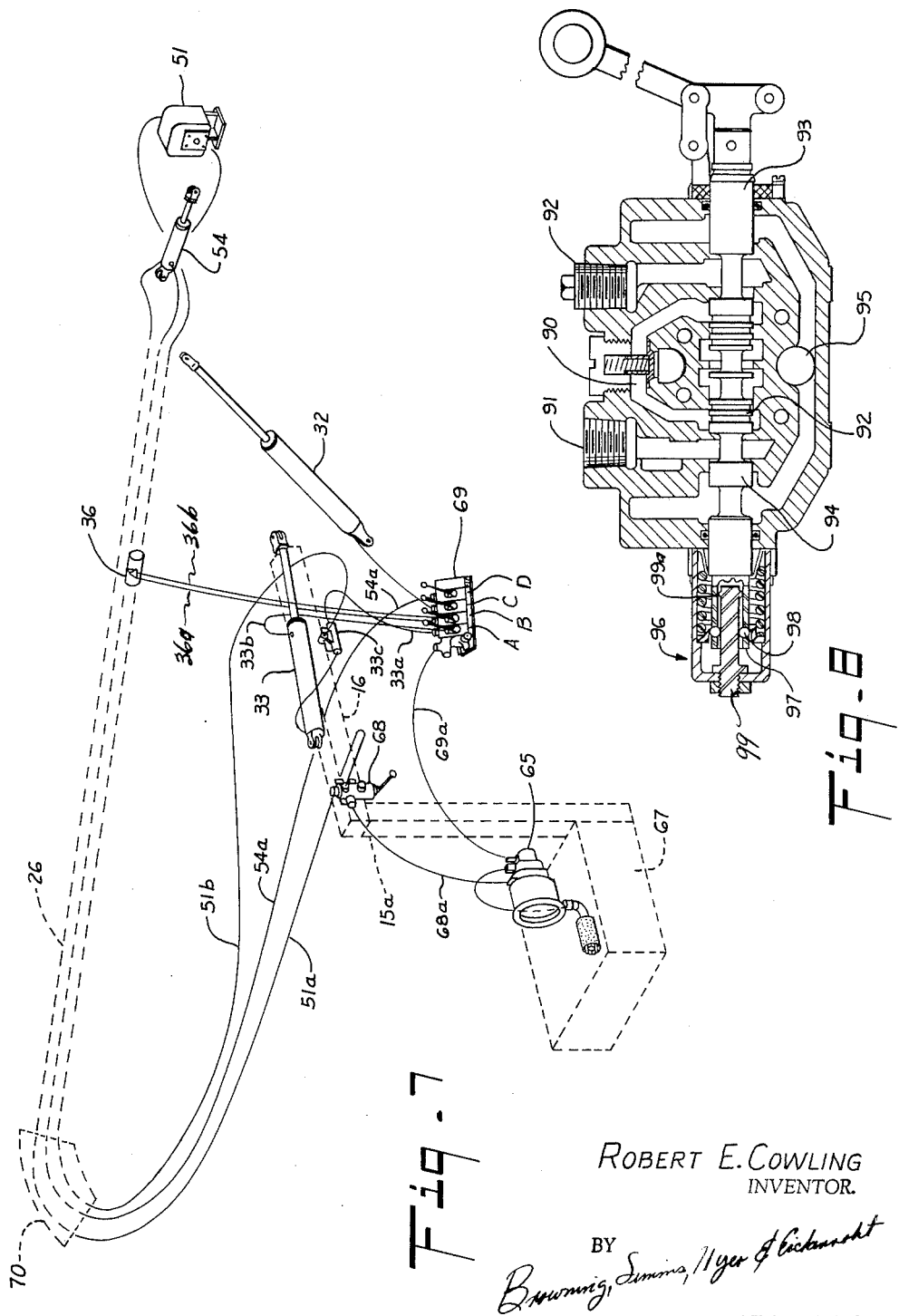

United States Patent Office 3,221,482
Patented Dec. 7, 1965

3,221,482
MOWING APPARATUS WITH A MOWER HEAD UNIVERSALLY SUPPORTED BY AN EXTENSIBLE BOOM
Robert E. Cowling, 5321 Rice Ave., Houston, Tex.
Filed Oct. 21, 1963, Ser. No. 317,726
7 Claims. (Cl. 56—25.4)

This invention relates to an improved mowing machine and method of operating the same.

One of the most difficult problems faced by both governmental and industrial maintenance departments is the cutting of grass and weeds on steeply inclined slopes and inaccessible places, such as bridge approaches, the side walls and bottoms of drainage ditches, fire walls, railroad right-of-ways, etc. Along these areas, the ground usually slopes at too great an angle for a conventional mower to operate safely on, or, as in the case of the bottom of drainage ditches, these areas are simply inaccessible to the conventional mower.

Mowing machines designed to cut the grass in these areas have been suggested in the past. Usually these machines employed extensible booms for holding the mower head in position to cut along the sloping or inaccessible ground with the boom being supported by a mobile carrier, such as a tractor, which remains on relatively level accessible ground. With this arrangement, any movement of the tractor affected the position of the mower head relative to the ground. Thus, if one wheel of the tractor encountered a low place it would tilt, moving the mower head either toward or away from the ground. For this reason, the operator had to be continually alert to such changes to make the necessary adjustments in the position of the boom to maintain the mower head properly spaced above the ground.

In addition, the extensible booms heretofore used with mowing machines of this type were large, heavy complicated mechanisms which usually employed hydraulic pistons and cylinders to move the booms inwardly and outwardly. Being of complicated construction and heavy, these booms increased the maintenance problems connected with the operation of the mower and required a stronger and usually a more complicated structure to support the boom.

It is an object of this invention to provide a mowing machine, adapted to be mounted on a mobile carrier, having a mower head carried by a boom which allows the mower head to freely follow the contour of the ground over which it travels substantially unaffected by any movement of the mobile carrier relative to the mower caused by the contour of the ground over which the carrier travels.

It is another object of this invention to provide an improved mowing machine of this type which employs relatively few parts, which is simple to operate and repair, and which is an integral unit which can be quickly and easily attached to and removed from a mobile carrier.

It is another object of this invention to provide a mowing machine wherein at least a portion of the torque imposed on the tractor by the laterally extended boom and mower head is counterbalanced by other portions of the machine.

A further object of the invention is to provide an extensible boom of novel design adapted for use with a mower machine which is lightweight, employs relatively few parts, and which is operated by a simple efficient, easily repaired mechanism.

Another object of the invention is to provide an extensible boom assembly adapted for use with a mowing machine which does not employ telescoping members.

A further object of the invention is to provide an extensible boom assembly adaptable to being employed in a mowing machine which employs a boom which can be hollow and used to support the means employed to transmit power to the outermost end of the boom.

Another object of the invention is to provide an extensible boom assembly wherein the boom is simply slidably supported by a sleeve whose length can be substantially shorter than the boom but which will allow the boom to be extended until only a relatively short portion of the boom remains in the sleeve.

A still further object is to provide an extensible boom having lateral support bearing which can be quickly and easily replaced without disassembling the boom.

It is another object of this invention to provide a method of operating a mowing machine of the type described wherein the mower head is free to freely follow the contour of the ground over which it travels.

These and other objects, features and advantages of the invention will be apparent to one skilled in the art upon a consideration of the specification, attached drawings and appended claims.

In the drawings, wherein like reference characters are used throughout to designate like parts:

FIG. 2 is a side view partly in elevation and partly in section of a portion of the extensible boom assembly showing the boom in its maximum extended position;

FIG. 3 is an enlarged view partly in section and partly in elevation of the end of the boom showing how the mower head is attached to the end of the boom and to the hydraulic cylinder mounted on the end of the boom to pivot the mower head around an axis which is perpendicular to a vertical plane through the longitudinal axis of the boom to which it is attached;

FIG. 4 is a view taken along 4—4 of FIG. 3 showing a front view of the connection between the boom and the mower head;

FIG. 5 is an exploded isometric view of the end of the sleeve portion of the extensible boom assembly showing the arrangement of the rollers used to support the boom as it moves back and forth through the sleeve and also illustrating the lateral bearing plates used to keep the boom in lateral alignment with the longitudinal axis of the sleeve;

FIG. 6 is a sectional view taken along line 6—6 of FIG. 5 showing the arrangement of the lateral bearing strips and the method of attaching the strips within the sleeve portion of the extensible boom assembly to allow them to be replaced without first removing the boom from the sleeve;

Figure 1:
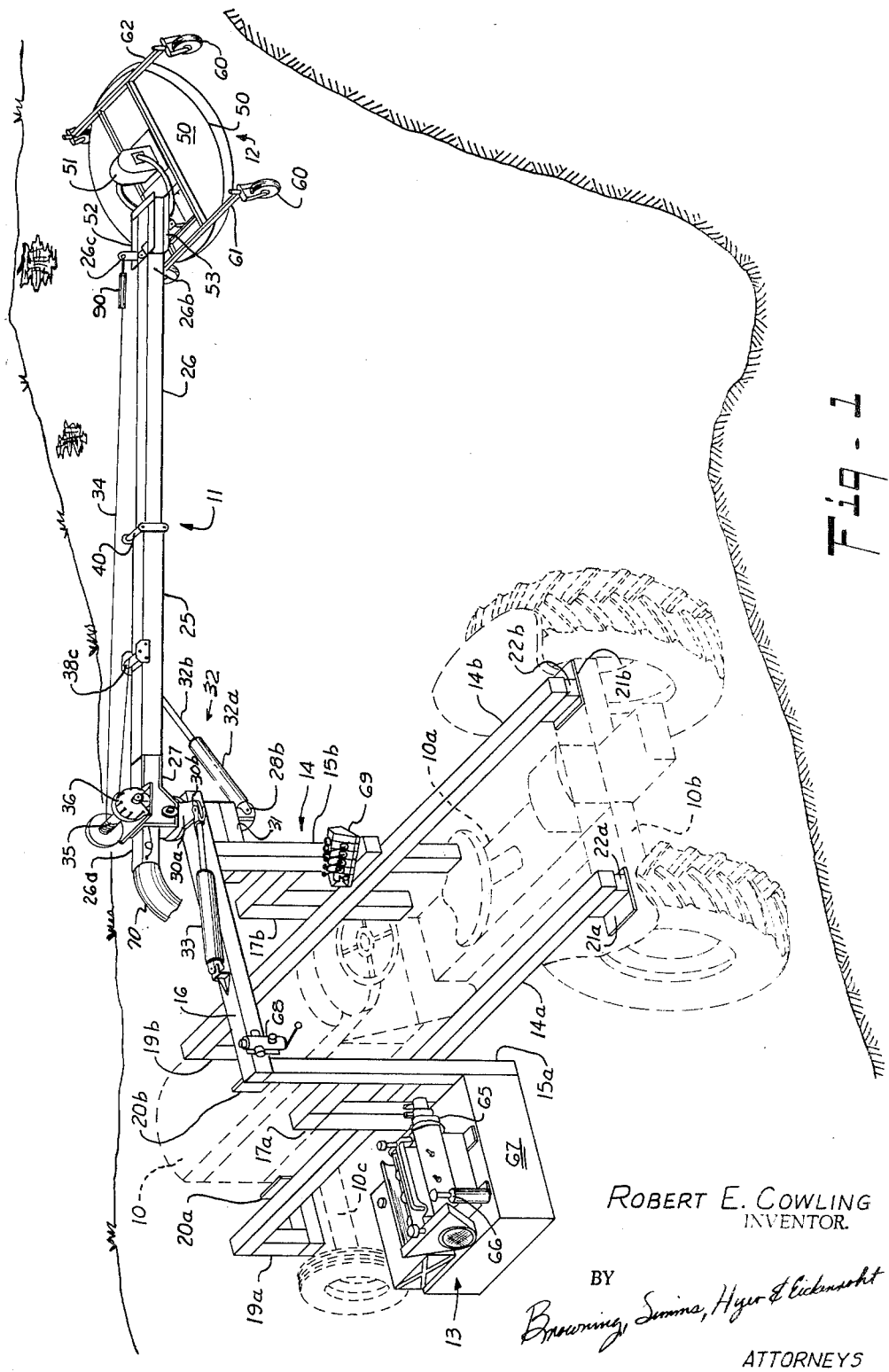
FIG. 1 is an isometric view of an embodiment of a mowing machine constructed in accordance with this invention showing the machine mounted on a tractor with the mowing head extended laterally from the side of the tractor to cut a swath along the side of a steep hill with the tractor moving along relatively level ground at the foot of the hill.

FIG. 7 is a partially isometric and partially schematic view of the hydraulic system of the mowing machine and also showing how the hoses which carry the pressure fluid to the cylinder, which adjusts the position of the mowing head relative to the boom, and to the hydraulic motor, which drives the mower head, are extended through the boom to eliminate the need for having to provide reeling means to accommodate the hose as the mower head is moved inwardly and outwardly relative to the tractor; and FIG. 8 is a view of a hydraulic valve which can be used to operate the lift cylinder which moves the boom in a vertical plane and the cylinder which adjusts the position of the mower head which in one position will relieve these cylinders of hydraulic pressure, thereby allowing the mower to freely adjust itself to the changing contour of the ground over which it travels.

An embodiment of a mowing machine, constructed in accordance with this invention, is shown in FIG. 1 mounted on a conventional tractor 10. In the drawing the tractor is shown in dotted lines, whereas the mowing machine is shown in solid lines.

In the embodiment illustrated the mowing machine includes an extensible boom assembly 11, a mower head 12 carried by the boom assembly; a power package 13, and a supporting frame or structure, generally indicated by the number 14 which supports the boom assembly and the power package and which in turn is supported by the tractor 10.

The supporting frame 14, includes two longitudinally extending parallel beams 14a and 14b which extend horizontally from the front to the rear of the tractor on each side of the main frame 10a, to support an inverted "U"-shaped structure comprising two upright members 15a and 15b and horizontal connecting member 16. Two "L"-shaped braces 17a and 17b are connected to horizontal beams 14a and 14b and upright members 15a and 15b, respectively, to add rigidity to the entire structure and to also provide an additional support for power package 13.

The ends of horizontal members 14a and 14b are mounted to distribute the weight of the machine between the front and rear axles of the tractor. In the embodiment illustrated, the front ends of the members are attached to the body of the tractor adjacent the frone axle 10c by means of "L"-shaped members 19a and 19b and plates 20a and 20b. The rear ends of the horizontal members, in turn, are attached directly on rear axles 10b of the tractor by means of plates 21a and 21b and shim blocks 22a and 22b.

Preferably, supporting frame 14 is of unitized construction allowing it and the mowing machine it supports to be removably mounted on the tractor. Thus, the entire mowing machine can be quickly and easily removed from the tractor when the mowing is completed to allow the tractor to be used for other purposes.

The members which make up the support frame are shown to be of box type construction. This type construction is particularly advantageous in connection with upright member 15a and horizontal cross member 16 as it allows these members to be used as a return line for the hydraulic fluid used to operate the machine which, as explained below, greatly shortens the hydraulic lines required.

Pivotally attached to one end of cross member 16 of the supporting frame is extensible boom assembly 11 which comprises sleeve 25 and boom 26 which extends through the sleeve and which is supported thereby. The sleeve and boom are both of hollow, box type, construction to provide each with a rectangular cross section so that relative rotation between the boom and sleeve is prevented.

Sleeve 25 is pivotally mounted to members 15b and 16 of support frame by means of bracket 27 which is pivotally attached to the rectangularly shaped upper end 28a of pivot shaft 28 by means of pin 29 (FIG. 2). Pivot shaft 28, in turn, extends down through bearing housing 31 which is mounted directly to members 15b and 16 and which is provided with appropriate bearings 31a to rotatably support pivot shaft 28 and the load imposed thereon by the boom assembly and mower head 12. Thus, the extensible boom assembly 11 is mounted for rotation in a vertical plane about pin 29 and for rotation in a horizontal plane by pivot shaft 28.

To move the extensible boom in the vertical plane, a pressure cylinder 32 is mounted with the cylinder 32a attached to the lower end 28b of shaft 28, which extends out the bottom of bearing housing 31, and with the piston rod 32b attached to bracket 25a on sleeve 25 so that by applying pressure to the pressure cylinder the sleeve can be moved up and down in the vertical plane of shaft 28. To control movement of the boom in the horizontal direction, a swing arm 30 is attached to the upper end 28a of shaft 28 having a laterally extending portion 30a. Pressure cylinder 33 is arranged with one end attached to horizontal member 16 of the supporting frame and the other end attached to the outer end of portion 30a, so that by actuating the cylinder, the swing arm will cause shaft 28 to rotate on bearings 31a thereby moving sleeve 25 and boom 26 in a horizontal plane.

Means are also provided to move boom 26 back and forth through sleeve 25 in order to cause movement of mower head 12 away from and toward the tractor as desired. In accordance with this invention, this movement is obtained by means of flexible line 34 which is wrapped around drum 35 of winch 36 mounted on sleeve 25, with the ends 34a and 34b of the flexible line attached to opposite ends 26a and 26b of boom 26. End 34a is attached to the boom by extending its end through an opening 34c where it is tied into a knot or provided with a clamp to keep it from coming back through. A bolt 34d is also provided around which one or more turns can be taken to relieve the knot or clamp of some of its load and to hold the line stationary with respect to opening 34c to keep the line from working against the edges of the opening. The other end 34b of the line is connected to a bracket 26c through turnbuckle 90 which provides means for tightening the line after the ends are attached to the boom.

With this arrangement by rotating drum 35, line 34 can be caused to be shortened between drum 35 and one end of boom 26, which will cause that end of the boom to move toward sleeve 25. As winch 36 causes drum 35 to take up line between it and one end of the boom, it will simultaneously pay out line at the same rate between the drum and the other end of the boom allowing it to move away at the same speed that the other end is moved toward the drum. The direction of rotation of the drum will, of course, determine which end moves toward the drum, therefore, by controlling the direction of rotation of the drum, end 26b of the boom can be moved either toward or away from the tractor as desired.

Preferably, winch 36 is mounted so the torque imposed on the tractor by its weight is a minimum. The closer the winch is to the tractor, however, the shorter the distance the boom can be extended since line 34, if connected directly to end 26a from the drum, will stop the outward travel of the boom when end 26a reaches its nearest point to drum 35. To avoid this, line 34 does not go directly from drum 35 to end 26a. This is best seen in FIG. 2 where the boom is shown in its outermost position with end 26a well beyond the inner end of sleeve 25. This is accomplished by providing an opening 37 in sleeve 25 at the point adjacent where it is desired for the end of the boom to stop, i.e., its point of outermost travel. Line 34 is then passed through opening 37 before it is attached to the end 26a of the boom and pulley 38a is rotatably mounted on shaft 38b over opening 37 to provide a rolling surface over which the line can travel in and out of the opening. Pulley 38a also keeps the line from being bent at too sharp an angle as it turns backward through the opening toward the end of the boom.

With this arrangement the boom can be extended outwardly until it reaches the position shown in FIG. 2 where line 34 will itself stop the outward movement of the boom, or inwardly until bracket 26c engages the end of the sleeve. The power output of the winch should be such that line 34 can stop the rotation of the drum when the boom reaches the end of its travel in either direction. The embodiment illustrated is hydraulically operated and pressure relief valves (not shown) are used to limit the power output of the winch. If an electric motor is used, stop switches can be located to be actuated and stop the winch when the boom reaches the end of its travel in either direction.

Roller 38c is also mounted on shaft 38b to provide a rolling surface against which the upper surface of the boom is forced by the weight of the extended portion of the boom. The fulcrum of the boom, of course, is located at roller 39 which is positioned at the end of sleeve 25 to provide a rolling surface for the boom as it travels in and out of the sleeve. Roller 40, which is located directly opposite roller 39 also assists in maintaining the boom in proper alignment within the sleeve as it moves through the sleeve. Usually the weight of the mower head on the end of the boom will be sufficient to cause the boom to exert a downward force on roller 39 and an upward force on roller 38c, even when the boom is in its completely retracted position. However, should this not be the case, then the fulcrum point would shift to the inner end of the sleeve and roller 40 would exert the downward force necessary to maintain equilibrium.

If desired, a plurality of rollers could be used on each side of the boom. Also, the surfaces of the sleeve itself or parallel rails with flanges, etc., could be used to provide surfaces along which the boom could slide and which would support the boom. These arrangements are, of course, the equivalent of the sleeve since they provide a support for the boom and an opening within which the boom is reciprocated, the "opening" in the case of the rails would obviously not have walls completely enclosing the boom in the sense that sleeve 25 provides an opening, however, "opening" as used here includes any groove, channel, etc., within which the boom reciprocates.

Means are also provided to maintain boom 26 is horizontal alignment as it travels through the sleeve and to keep it from becoming cocked in the sleeve due to the horizontal forces exerted on it by the mower head. This is particularly important when the boom is extended so that end 26a is located within sleeve 25 as shown in FIG. 2. To maintain the boom in lateral alignment, it is preferred to use replaceable side bearings located on the inside of sleeve 25 between the inner side walls of the sleeve and the sides of the boom.

An embodiment of bearings for this purpose are shown in FIGS. 5 and 6. They are designed so they can be replaced without having to remove the boom from the sleeve which is an important feature of this invention. The bearing strips indicated by numbers 41 and 42, are made from a good bearing material, nylon being the material which is presently being used in the commercial embodiment of the invention. However, any suitable plastic, metallic or other bearing material could also be used. Strip 42 is provided with a plurality of holes 43 which are chamfered inwardly to receive a flat head type plug 44, whereas bearing strip 41 is provided with a plurality of tapped holes 45 to receive threaded bolts 46. The plugs and the bolts should be made from a bearing material also, preferably the same material as is used for the strips. To provide sufficient wall thickness in bearing strip 41 for tapped holes 45, strip 42 is made as thin as possible so that the clearance between the inner side surfaces of sleeve 25 and the outer surface of boom 26 need not be any more than absolutely necessary. Also bearing strip 41 is located to engage the lower side of the boom to avoid interfering with line 34.

To install the bearings with the boom in place, the boom is pushed toward the left-hand side wall of sleeve 25, as viewed in FIG. 6, until it is in engagement with the lefthand wall of sleeve 25. In this position there is ample clearance for bearing plate 42, with flat head plugs 44 in place, to slide between boom 26 and the inner surface of the righthand wall of sleeve 25 until plugs 44 are in position to pass through openings 47 provided therefor in the side of sleeve 25. Once in this position the sleeve is pulled against the wall and cotter keys 44a are inserted through opening 48 provided therefor in the end of plug 44 to thereby anchor the strip in position against the wall.

Boom 26 is then moved to the right until it is either in engagement with bearing plate 42, or there is sufficient clearance between the boom and the inner surface of the lefthand wall of sleeve 25, to allow bearing plate 41 to be inserted between the boom and the sleeve. The sleeve is then located with tapped holes 45 adjacent openings 48 provided therefor in the side of sleeve 25 through which threaded bolts 46 can be inserted and screwed in tapped holes to anchor bearing plate 41 in position. An opening 49 is also provided in bolts 46 to receive cotter keys 46a to hold the bearing plate against inward movement.

Mower head 12, which is carried on the end of boom 26, is of generally conventional construction, having a housing 50 within which is rotated a group of cutter blades (not shown) which cut the grass, weeds and brush encountered by the mower. Driving the cutter blades is a pressure actuated motor 51. In the embodiment illustrated, motor 51 is a pressure operated motor of preferably the hydraulic type since in this way the power required to operate the mower head can be produced at a point remote from the mower and then transmitted to the mower through pressure hoses. This allows the weight of the mower head to be kept to a minimum, since the hydraulic motor may be mounted with its arbor extending through housing 50 and carrying the cutter blades directly. This eliminates the weight of gearing or pulley drives at this outermost position.

The outer end 26b of boom 26, beyond the point where line 34 is attached, is of bifurcated construction. It consists of two parallel channels 52 and 53 spaced apart sufficiently to allow pressure cylinder 54 to be mounted therebetween. Extending downwardly from the outer end of each channel member are mounting lugs 55 and 56. The lugs are provided with axially aligned openings to receive shaft 57 which extends through the lugs and through an opening in bracket 58 which, in turn, is pivotally attached to two ribs attached to housing 50 of the mower head by means of shaft 59. Shaft 59 extends in a direction perpendicular to the direction of shaft 57 to thereby allow mower head 12 to pivot around the axis of shaft 59 which is in the plane of the longitudinal axis of the boom and also to pivot around the axis of shaft 57 which is perpendicular to a vertical plane passing through the longitudinal axis of the boom. Thus, the mower head can be moved around shaft 57 into position to cut inclined surfaces, and it can also pivot around shaft 59 as the ground over which it travels moves the mower head up and down.

Pressure cylinder 54 is attached to lug 58a which is located on bracket 58 at a point spaced from shaft 57 so that movement of rod 54a of pressure cylinder 54 will cause mower head to pivot around shaft 57.

To space the cutting blades of mower head 12 the desired distance above the ground, wheels 60 are attached to housing 50 by means of cross bars 61 and 62 which are in turn attached to housing 50. Wheels 60 are adjustable so that the distance the cutter blades are held above the ground can be adjusted as desired depending upon the type of foliage being mowed. Wheels 60, of course, as they roll over the ground will cause the mower head to rotate around shaft 59 as the contour of the ground changes up and down with respect to the end of the boom.

As will be explained in detail below, the pressure in cylinder 54 can be released when desired during the mowing operation to allow the mower to be free to pivot not only around shaft 59, but also around shaft 57 to thereby allow the mower to freely adjust itself to all of the varying contours of the ground that it travels over. Further, since the level of the ground relative to the tractor will also vary as the mower moves along, means are also provided to relieve the pressure in cylinder 32 thereby allowing the mower to move up and down as required by the contour of the ground. Of course, with no pressure in cylinder 32 the weight of the boom is shared between the tractor and the wheels on the mower head and therefore the boom must be of light weight construction to maintain the downward force on the wheels at a minimum. For example, a light weight boom assembly such as boom assembly 11 described above is particularly well suited for this purpose since the weight it will exert on the mower head when fully extended is not above the capacity of the mower head to support.

Providing pressure fluid, which in the preferred embodiment is hydraulic fluid, to the pressure cylinders and hydraulic motors required to operate the mowing machine is hydraulic pump 65 which is driven by an appropriate engine 66. Hydraulic fluid is supplied to hydraulic pump 65 from tank 67 upon which the engine and pump are mounted. These components, in turn, are attached to upright members 15a and 17a on the left-hand side of supporting frame 14 and extend outwardly therefrom to at least partially counterbalance the turning torque imposed on the supporting frame by the laterally extended boom assembly and mower head. In this way, a unitized construction as illustrated in FIG. 1 is provided, which allows the mowing machine to be mounted on and removed from a tractor. Further, with the components arranged in this manner, the amount of ballast or counterweights necessary is greatly reduced, and in some cases eliminated, since the turning torque imposed on the tractor by the outwardly extending mower head and boom, even when in its outermost position, will be at least partially offset by the opposing torque produced by the tractor with the help of power package 13.

Referring now to FIG. 7, where a schematic diagram of the hydraulic system of the mowing machine of FIG. 1 is illustrated, the operation of the machine will be described. Hydraulic fluid is pumped from pump 65, which is driven by motor 66, to control valve 68 through hose 68a and to the back of control valve group 69 through hose 69a. Control valve 68 is used to start and stop hydraulic motor 51 which drives the mower blades. Line 51a leads from the control valve to the motor 51 and supplies it with hydraulic pressure whereas line 51b returns the hydraulic fluid from motor 51 and is connected into hollow cross member 16 of the supporting frame which in turn is connected to hollow, upright member 15a with the members arranged to provide a conduit through which the hydraulic fluid can flow back to storage tank 67.

Valves A, B, C, and D of valve group 69 are mounted side by side but they operate independently to control the operation of the other hydraulically powered equipment in the system. Thus valve A controls the flow of hydraulic fluid to cylinder 33, which controls the swing of the boom in a horizontal plane. This pressure cylinder is preferably a double acting cylinder in that hydraulic pressure can be applied on either side of the piston and move the boom in either direction around the longitudinal axis of shaft 28. Lines 33a and 33b are connected from valve A to cylinder 33, each of which acts as an exhaust line when the other is the power line. Preferably, a pressure relief valve 33c is placed in line 33a which moves the boom forward relative to the tractor, and set to relieve the pressure in the cylinder, to allow the boom to move rearward before any damage is done to the boom or related equipment, should it encounter an obstruction.

Control valve B, in turn, controls the flow of hydraulic fluid to the motor which drives winch 36 which moves the boom in and out through sleeve 25. Lines 36a and 36b lead to the winch motor from valve B which controls which line is the pressure line and which is the exhaust, thereby controlling the direction of rotation of the winch and the direction of movement of boom 26.

Valve C controls the flow of hydraulic fluid through line 54a to the tilt pressure cylinder 54, which controls the angle of the mower head with respect to the end of the boom. Only one hydraulic line is needed since this particular pressure cylinder is a one-way cylinder since it needs to exert a force in one direction only as the manner in which the mower head is attached allows the mower head to move by gravity in the other direction.

Valve D controls the flow of pressure fluid to pressure cylinder 32 which is the lift cylinder which moves the boom up and down in a vertical plane. This cylinder also needs only to be a one-way cylinder, since the weight of the boom will move the cylinder in the downward direction.

A cross sectional view of a typical control valve such as the type used with this machine is shown in FIG. 8. This particular valve is commercially available and is manufactured by Gresen and Company and is their Model 25PK, Directional Control Valve. It is a four-position valve which can supply pressure fluid to either side of the piston of a pressure cylinder, equalize the pressure across the piston in the cylinder or simply release the pressure to the pressure cylinder allowing the piston to freely move in the cylinder in either direction. This latter characteristic is particularly important in connection with cylinders 32 and 54, since it allows the mowing machine to be operated in accordance with the method of this invention whereby the mower head is free to follow the contours of the ground over which it travels. Thus, the valve will be described in connection with the control of cylinder 32.

As shown, pressure fluid, which enters the valve through port 90, is prevented from entering outlet 91, which is connected to cylinder 32, by valve 92 on plunger 93. In this case, since cylinder 32 is a one-way operating pressure cylinder, the second outlet 92, which would normally be connected to the opposite side of the piston in the cylinder, is plugged and is inoperative. To actuate the pressure cylinder, plunger 93 is moved in a right-hand direction to move valve 92 and open the passageway from port 90 to outlet 91 to the pressure cylinder. By moving the plunger further to the right the valve member 94 closes off port 90 and port 91 is connected to the return line 95. In this position, of course, the piston is free to move back and forth in the cylinder as desired. A locking mechanism 96 is provided to hold the plunger in this latter position and allow the operator to inactivate pressure cylinder 32 when he desires to do so.

In this way the operator can extend the boom out until the mower head is in the desired position by means of winch 36; position it laterally by means of cylinder 33; lower it down until wheels 60 engage the ground by means of cylinder 32, at which time cylinder 32 and cylinder 54 can be made inoperative by means of control valves C and D, in the manner described above, and the mower head will be free to move along on wheels 60 and follow the contour of the ground over which it travels.

The locking assembly 96 on the hydraulic control valve shown in FIG. 8 is a detent type of locking arrangement in that plunger 93 is provided with an extension 97 which carries balls 98 which move over detents 99a on detent bar 99 when the plunger is moved far enough in the right-hand direction. The inter-engagement of detents 99a and balls 98 will releasably hold the plunger against movement to the left until forced to do so by the operator.

An additional advantage is obtained in connection with the hydraulic system by using an extensible boom assembly constructed in accordance with this invention. For since this type boom does not telescope or otherwise move into and out of a closed end support member, the hydraulic hoses, which supply hydraulic power to drive motor 51 and cylinder 54 can be extended through the hollow boom 26 and supported thereby. Thus, the only unsupported portions of these hoses are between the inner end of boom 26 and the point where they are supported by the support frame. For example, line 54a, which is connected to valve D located on the right-hand side of the tractor, can be conveniently attached to horizontal member 16 by a bracket (not shown) at a point where the unsupported portion of the hose between the member 16 and the end of the sleeve will be the shortest when the boom is all the way in. When the boom is all the way in, of course, the distance from the horizontal member 16 to the inner end of the boom will be the longest which determines the minimum amount of hose which must be provided. Further, by mounting control valve 68 on member 16 and by using the hollow interior of members 16 and 15a as a return line for the hydraulic fluid, lines 51a and 51b can be arranged with substantially the same unsupported length as line 54a.

This results in the elimination of any need for providing spring driven reeling equipment, etc., to take in and pay out the hydraulic hoses as the boom moves toward and away from the tractor. This greatly simplifies the structure of the mowing machine since hydraulic lines when subjected to hydraulic pressure in the amount normally used to drive a hydraulic motor, i.e., 1400–1600 p.s.i., are stiff and difficult to coil around a reel.

To help lead the hydraulic lines into boom 26, and to keep the hoses from being bent too sharply, a hose guide 70 is attached to the outer end of the boom. This guide can be made of any flexible material stiff enough to support the hoses sufficiently to keep them from being bent at too great an angle as they enter the end of the boom, yet it also must be flexible enough to straighten out as the boom travels into sleeve 25 as shown in FIG. 2. In the commercial embodiment of the invention, the hose guide is being made from fabric reinforced rubber.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. Mowing apparatus adapted to be attached to a mobile carrier, comprising an extensible boom assembly including a boom and a supporting member, said supporting member having an opening therein, in which the boom is telescopically mounted for reciprocation within the opening relative to the support member and means for pivotally mounting the supporting member on a mobile carrier for movement in both a vertical and a horizontal plane; a flexible line having its ends attached to opposite ends of the boom, and boom reciprocating means mounted on the supporting member and engaging the flexible line intermediate its ends for shortening the length of line between the boom reciprocating means and one end of the boom while simultaneously lengthening the portion of the line between the boom reciprocating means and the other end of the boom to thereby reciprocate the boom within the opening relative to the supporting member; a power operated mower head with cutting means and with ground engaging means to support mower head in a predetermined position above the ground; means providing a universal connection between the mower head and the outboard end of the boom to provide for movement of the mower head relative to the boom as the mower head changes its position to conform with changes in contour of the ground over which it traverses; means operatively associated with the supporting member for moving the supporting member to cause the boom to move the mower head in a vertical plane; and means operatively associated with the supporting member for moving the supporting member to cause the boom to move the mower head in a horizontal plane.

2. Mowing apparatus adapted to be mounted on a mobile carrier comprising an extensible boom assembly, including a boom and means for moving the boom laterally outwardly and inwardly relative to the path of travel of a mobile carrier; a power operated mower head with cutting means, said head provided with wheels for engaging the ground to rollingly support the mower head; means providing a universal connection between the mower head and the outboard end of the boom to provide for movement of the mower head relative to the boom as the mower head changes its position to conform with changes in contour of the ground over which it traverses; and means operatively associated with the boom for pivotally mounting the boom on a mobile carrier for movement relative to the mobile carrier in a vertical plane; means for moving said boom in said vertical plane to move the mower head wheels into engagement with the ground and for relaxing same when said wheels engage the ground whereby the mower head is free to follow the contour of the ground engaged by the wheels as it is propelled.

3. Mowing apparatus adapted to be mounted on a mobile carrier comprising an extensible boom assembly, including a boom and means for moving the boom laterally outwardly and inwardly relative to the path of travel of a mobile carrier; a power operated mower head with cutting means provided with wheels for engaging the ground and rollingly supporting the mower head; means pivotally attaching the mower head to the boom for universal movement relative to the boom as the mower head changes its position to conform with changes in the contour of the ground over which the wheels traverse; and means for pivotally mounting the boom assembly on a mobile carrier to allow the boom to pivot in a vertical plane whereby the mower head is free to follow the contour of the ground engaged by the wheels as it is propelled by a mobile carrier.

4. The combination of claim 3, wherein the boom assembly includes a supporting member with means for pivotally mounting the supporting member on a mobile carrier for movement in a vertical plane, a boom operatively mounted for reciprocation on the supporting member, line means having line parts secured to the boom adjacent the ends of the boom, and means secured to the line means at a position remote from the parts attached to the boom for selectively shortening either of the line extensions to the boom ends while simultaneously lengthening the other extension to thereby reciprocate the boom.

5. Mowing apparatus adapted to be mounted in a mobile carrier comprising a supporting member with means for pivotally mounting the supporting member on a mobile carrier for movement in a vertical plane, a boom operatively mounted for reciprocation on the supporting member, line means having parts secured to the boom adjacent the boom ends, means secured to the line means at a position remote from the parts attached to the boom for selectively shortening either of the line extensions to the boom ends while simultaneously lengthening the other extension to thereby reciprocate the boom; a power operated mower head with a cutter means, said head provided with ground engaging wheels; means connecting the mower head to the outboard end of the boom to provide for movement of the mower head relative to the boom as the mower head changes its position to conform with changes in contour of the ground over which the wheels traverse; means for moving the supporting member vertically about its pivot to position the boom to cause the mower head wheels to engage the ground; and means to release the last-mentioned means whereby the boom is supported between the supporting member and the mower head during a mowing operation and the mower head is self-accommodating to changes in contour of the ground the mower head traverses.

6. Mowing apparatus adapted to be mounted on a mobile carrier comprising a boom; means supporting the boom for reciprocation on the supporting means between an extended and a retracted position laterally of the path of travel of a mobile carrier therefor, said supporting means being substantially shorter than the boom so that when the boom is in retracted position, a substantial length of the boom extends beyond one end of the supporting means and when in extended position, a substantial length extends beyond the other end of supporting means; power means for reciprocating the boom between its said extended and retracted positions; a power operated mower head with cutting means and provided with wheels for engaging the ground and rollingly supporting the mower head; means pivotally attaching the mower head to the boom for universal movement relative to the boom as the mower head changes its position to conform with changes in the contour of the ground over which the wheels traverse; and means for pivotally mounting the boom supporting means on a mobile carrier to allow the boom to pivot in a vertical plane whereby the mower head is free to follow the contour of the ground engaged by the wheels as it is propelled by a mobile carrier.

7. Mowing apparatus adapted to be mounted on a mobile carrier comprising an extensible boom assembly, including a supporting member with means for pivotally mounting it on a mobile carrier for movement in a vertical plane, a boom operatively mounted for reciprocation on the supporting member, line means having line parts secured to the boom adjacent the ends of the boom and means secured to the line means at a position remote from the parts attached to the boom for selectively shortening either of the line extensions to the boom ends while simultaneously lengthening the other extension to thereby reciprocate the boom; a power operated mower head with cutting means, said head provided with wheels for engaging the ground to rollingly support the mower head; means providing a universal connection between the mower head and the outboard end of the boom to provide for universal movement of the mower head relative to the boom as the mower head changes its position to conform with changes in contour of the ground over which it traverses; means operatively associated with the boom assembly for moving the boom to cause the mower head to move in a vertical and a horizontal plane whereby the mower head is free to follow the contour of the ground engaged by the wheels as it is propelled.

References Cited by the Examiner

UNITED STATES PATENTS

| | | | |
|---|---|---|---|
| 1,237,878 | 8/1917 | Downie | 214—102 |
| 1,543,838 | 6/1925 | Fogarty | 214—102 |
| 1,911,516 | 5/1933 | Landing | 56—25 |
| 2,165,851 | 7/1939 | Harman | 56—25 |
| 2,462,926 | 3/1949 | Wilson et al. | 214—132 |
| 2,539,934 | 1/1951 | Smith et al. | 56—25.4 |
| 2,668,625 | 2/1954 | Garland | 212—55 |
| 2,684,159 | 7/1954 | Oldenkamp | 214—132 |
| 2,788,139 | 4/1957 | Tendresse | 214—141 |
| 2,832,183 | 4/1958 | Pittman | 56—25 |
| 2,991,612 | 7/1961 | Holmes | 56—25.4 |
| 2,997,835 | 8/1961 | Stewart | 56—25 |
| 3,050,196 | 8/1962 | Yates | 212—55 |
| 3,053,033 | 9/1962 | Maguire | 56—6 |
| 3,077,718 | 2/1963 | McLaughlin | 56—25.4 |
| 3,087,296 | 4/1963 | Cowles | 56—25.4 |
| 3,112,035 | 11/1963 | Knight | 212—55 |
| 3,135,079 | 2/1964 | Dunn. | |

ABRAHAM G. STONE, *Primary Examiner.*

ANTONIO F. GUIDA, T. GRAHAM CRAVER,
*Examiners.*

J. O. BOLT, *Assistant Examiner.*